(12) United States Patent
Levine et al.

(10) Patent No.: US 8,428,302 B2
(45) Date of Patent: Apr. 23, 2013

(54) AUTOMATIC SPINE CREATION FOR BOOK COVER IMAGES THAT DO NOT HAVE SPINES

(75) Inventors: Jonathan D Levine, Rochester, NY (US); Michael J Evan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/402,918

(22) Filed: Feb. 23, 2012

(65) Prior Publication Data

US 2012/0155701 A1 Jun. 21, 2012

Related U.S. Application Data

(62) Division of application No. 12/268,600, filed on Nov. 11, 2008, now Pat. No. 8,131,009.

(51) Int. Cl.
*G06K 9/00* (2006.01)
*G06K 9/36* (2006.01)

(52) U.S. Cl.
USPC .............................. 382/100; 382/276; 412/1

(58) Field of Classification Search ........... 412/1–43
See application file for complete search history.

(56) References Cited

U.S. PATENT DOCUMENTS

| | | | | |
|---|---|---|---|---|
| 5,271,065 A * | 12/1993 | Rourke et al. | ................. | 382/112 |
| 5,764,383 A * | 6/1998 | Saund et al. | ................... | 358/497 |
| 6,012,890 A * | 1/2000 | Celorio Garrido | .............. | 412/19 |
| 6,115,482 A * | 9/2000 | Sears et al. | ..................... | 382/114 |
| 6,142,375 A * | 11/2000 | Belka et al. | .................... | 235/454 |
| 6,193,458 B1 * | 2/2001 | Marsh | ............................... | 412/1 |
| 6,364,590 B1 * | 4/2002 | Gayoso | ........................... | 412/18 |
| 6,393,147 B2 * | 5/2002 | Danneels et al. | ............. | 382/165 |
| 6,416,082 B1 * | 7/2002 | Gayoso | ........................... | 281/29 |
| 6,549,213 B1 * | 4/2003 | Sadka | ............................ | 345/593 |
| 6,687,420 B1 * | 2/2004 | Matsuda et al. | ............... | 382/286 |
| 6,996,290 B2 * | 2/2006 | Cariffe | ........................... | 382/275 |
| 7,171,618 B2 | 1/2007 | Wenn et al. | | |
| 7,261,612 B1 * | 8/2007 | Hannigan et al. | ............. | 446/175 |
| 7,298,514 B2 * | 11/2007 | Nishimura | .................... | 358/1.15 |
| 7,413,175 B2 | 8/2008 | Levine et al. | | |
| 7,463,772 B1 * | 12/2008 | Lefevere et al. | .............. | 382/215 |
| 7,474,759 B2 * | 1/2009 | Sternberg et al. | ............. | 382/100 |
| 7,474,801 B2 * | 1/2009 | Teo et al. | ....................... | 382/284 |
| 7,477,426 B2 * | 1/2009 | Guan et al. | ..................... | 358/474 |
| 7,499,588 B2 * | 3/2009 | Jacobs et al. | ................... | 382/182 |
| 7,508,978 B1 * | 3/2009 | Lefevere et al. | .............. | 382/154 |
| 7,864,985 B1 * | 1/2011 | Lefevere et al. | .............. | 382/112 |
| 7,903,876 B2 * | 3/2011 | Zandifar et al. | .............. | 382/176 |
| 7,963,733 B2 * | 6/2011 | Marsh | ............................... | 412/37 |
| 8,059,892 B1 * | 11/2011 | Fan | .................................. | 382/167 |
| 2001/0014173 A1 * | 8/2001 | Danneels et al. | ............. | 382/165 |
| 2002/0126918 A1 * | 9/2002 | Solis | .............................. | 382/306 |
| 2006/0023956 A1 * | 2/2006 | Hugosson et al. | ............ | 382/232 |
| 2006/0028662 A1 | 2/2006 | Dobrovolsky | | |
| 2006/0133664 A1 * | 6/2006 | Hong et al. | ..................... | 382/154 |
| 2006/0257232 A1 | 11/2006 | Sullivan et al. | | |
| 2007/0280513 A1 * | 12/2007 | Engheta et al. | ................ | 382/124 |
| 2008/0043259 A1 * | 2/2008 | Triplett et al. | .................. | 358/1.9 |
| 2008/0129032 A1 * | 6/2008 | Conrad et al. | ................... | 281/29 |

(Continued)

*Primary Examiner* — Manav Seth

(57) ABSTRACT

A method for automatically creating spine image areas for book covers that were originally created for books without spines includes adding image areas between the front and back cover images to make a single image with the spine being a user-specified solid color or bitmap image.

7 Claims, 2 Drawing Sheets

U.S. PATENT DOCUMENTS

| | | | |
|---|---|---|---|
| 2009/0252439 A1* | 10/2009 | Kacher et al. | 382/317 |
| 2009/0296993 A1* | 12/2009 | Mestha et al. | 382/112 |
| 2009/0306809 A1* | 12/2009 | Sugimoto et al. | 700/128 |
| 2010/0158639 A1* | 6/2010 | Manico et al. | 412/37 |
| 2011/0176720 A1* | 7/2011 | Van Osten et al. | 382/154 |
| 2011/0211755 A1* | 9/2011 | Xu | 382/165 |

* cited by examiner

AUTOMATIC SPINE CREATION FOR BOOK COVER IMAGES THAT DO NOT HAVE SPINES

CROSS-REFERENCE TO RELATED APPLICATIONS

This is a divisional of U.S. application Ser. No. 12/268,600; filed Nov. 11, 2008, now allowed, by the same inventors, and claims priority therefrom. This divisional application is being filed in response to a restriction requirement in that prior application. The heretofore specifically enumerated prior application is hereby incorporated by reference.

This present disclosure is related to book cover production and, more particularly, relates to automatically creating spine image areas for books originally created without spines.

Conventionally, in digital book production print workflow, electronic files for book blocks and covers are stored in a digital repository. To produce a book, the electronic files are retrieved and sent to a workstation or server, such as, for example, a digital front end for data manipulation. The book block and cover files are subject to a raster image process and then sent to an appropriate printer for printing of the book blocks and covers. The printed book blocks and covers are then finished by binding the covers to the book blocks.

For example, automated cover-driven digital book production is shown in U.S. Pat. No. 7,413,175 B2 while a system for and method of producing a book on demand is disclosed in U.S. Patent Application Publication No. US 2006/0028662 A1. U.S. Patent Application Publication No. US 2006/0257232 A1 is directed to cover on text in its system and method for book dualbind production. As disclosed in U.S. Pat. No. 7,171,618, the optimal version of a document can depend on the user's need and the presentation device, and can govern choices of content, as well as, style. For example, the user can select from among multiple versions of the document based on the 'jobs' requirements. All of the heretofore-mentioned references are included herein by reference to the extent necessary to practice the present disclosure.

With the book covers mentioned-hereinabove being always designed with a particular application in mind, it has been found that a number of customers who have original cover images designed for non-perfect-bind applications (such as, saddle stitch printing) now need to print perfect-bind versions using the same originals. That is, since saddle stitched books have no spine; the covers were designed without a spine image. But, perfect-bind books require a spine image. Therefore, the customer must go through the time consuming and costly process of modifying the original image so that it contains a spine.

Hence, there is a need for a less time consuming process of converting original cover images designed for non-perfect-bind applications to perfect-bind versions using the same originals.

Accordingly, a method is disclosed that automatically creates spine image areas for book covers that were originally created for books without spines. The exemplary method includes adding image areas between the front and back cover images to make a single image, the spine being a user-specified solid color or bitmap image.

Various of the above-mentioned and further features and advantages will be apparent to those skilled in the art from the specific apparatus and its operation or methods described in the example(s) below, and the claims. Thus, they will be better understood from this description of these specific embodiment(s), including the drawing figures (which are approximately to scale) wherein:

Figure 1:
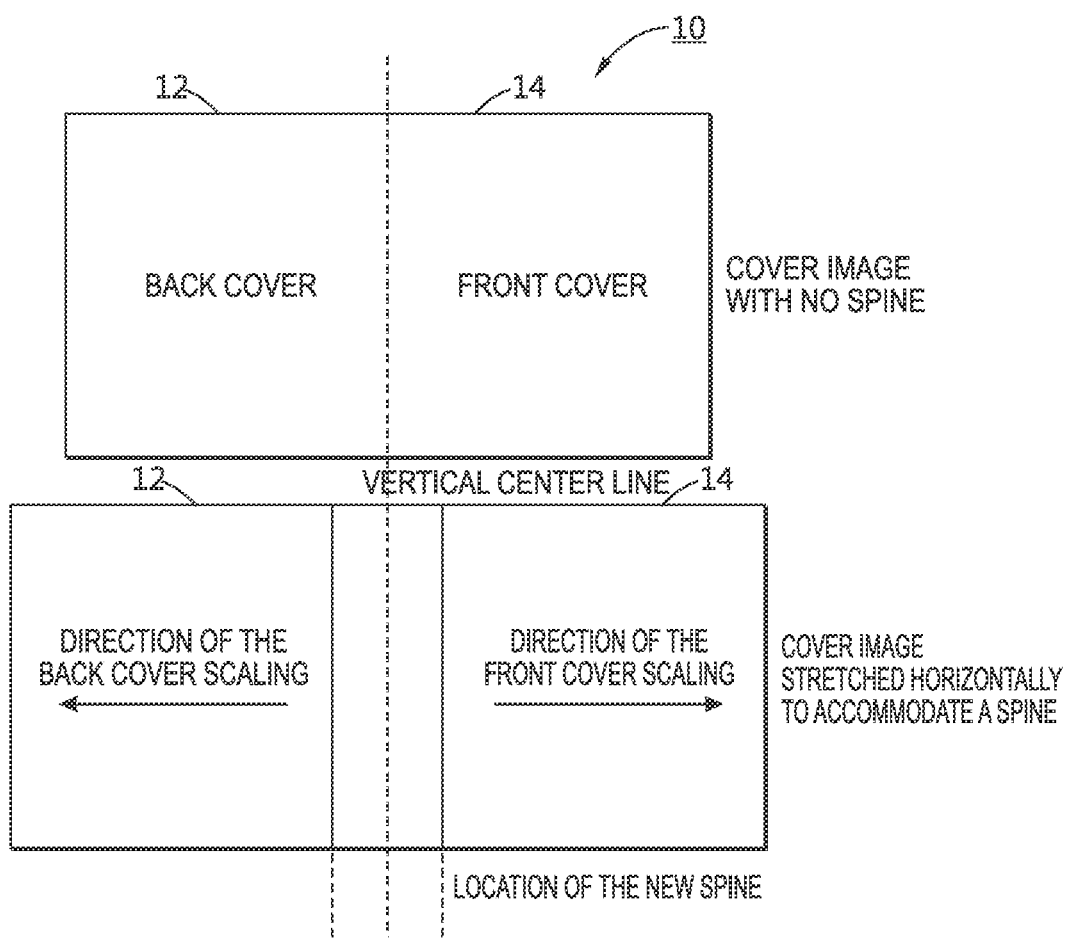
FIG. 1 is an illustration showing how a digital cover image stretches to allow for a spine.

Shown in the FIG. 1 is an illustrative example of how the disclosure herein is used to accommodate a customer's need to convert a saddle stitch cover image 10 (i.e., containing no spine) to a cover image that will work for a Perfect Bind. It should be understood that there are other situations where a spine must be created. In the FIG. 1, front and back cover images 12 and 14, respectively, are shown with vertical a center line separating the two and no spine. In order to insert a spine between the two images, the front and back cover images are stretched horizontally in the direction of the arrows to accommodate a spine. In order to insert a spine where there is none: the book block pages must all be the same size; and if the cover has separate front and back cover images, they must be the same size.

Two examples of automatic spine creation will be described hereinafter including: (1) creating a spine for a single, undifferentiated cover image; and (2) creating a spine when the front and back covers are separate images. However, in both applications, before the computer system through the use of, for example, FreeFlow Process Manager sold by Xerox® can automatically generate a cover, it gathers or calculates the following information by any combination of manually user entry, automatically by gathering information from the job files, and/or automatically supplied by the customer's Management Information System. The gathered information includes: the height of the existing cover image (from the media box in the cover file or by user entry); the height of the final book (from the trim box in the cover file or by user entry); the thickness of the book (from the required number of sheets in the printed book block and the weight of the paper to be used for printing the book block; this information comes from the number of pages in the book block, the desired plex of the output, any inserts required, any forces-to-next-page, and the weight of the paper stock in use); if any text is to be placed on the spine, the text, the orientation of the text (sideways facing back, sideways facing front), the font, and the font color can be specified. The users can specify the exact size (font size) and location of the text (including line breaks). Or the user can let the system automatically create a font that will fit (in this case the user enters the size of the spine's internal margins); the spine's background color (if any; not used when the system creates the spine by stretching the original image as will be discussed hereinafter; and the user or the system must specify the location of the cover file and the book block file (they may be the same file; if so, the user or system must specify the location of the cover pages in the file and the location of the book block pages in the file).

Figure 2:
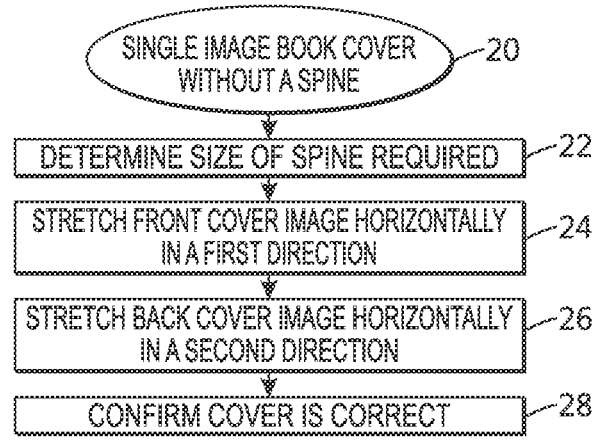
FIG. 2 is a flow chart of a process showing how a spine is placed into a book cover image with an original single front and back image.

In a first example as shown in FIG. 2, and in accordance with the present disclosure, creating a spine for a single, undifferentiated cover image 20 that was originally created for a saddle stitched book (i.e., no spine image is included) involves the user making a choice to have the system either split the front cover from the back cover and insert a new spine between the front and back covers, or create a spine by stretching the original cover image. If stretching the cover image is selected, the system automatically: (a) determines the required size of the spine in block 22; (b) it then: stretches (anamorphic, horizontal enlargement) the front portion of the cover image (to the right of the image's center line) towards the right, using the vertical center line of the image as a stable point (that is the line that separates the front part of the cover from the back part), with the enlargement adding half the required additional extra horizontal size to the cover to accommodate the new spine as shown in block 24; (c) next in block 26, it stretches (anamorphic, horizontal enlargement) the back portion of the cover image (to the left of the image's center line) towards the left, using the vertical center line of the image as a stable point (that is the line that separates the front part of the cover from the back part), with this enlargement adding half the required additional extra horizontal size to the cover to accommodate the new spine; and (d) the user in block 28 then visually and numerically confirms that the new cover image is correct. Numerically confirming the correctness of a cover image refers to FreeFlow Process Manager automatically comparing the original job data with the size of the resulting spine to ensure that the cover is the right size.

Figure 3:
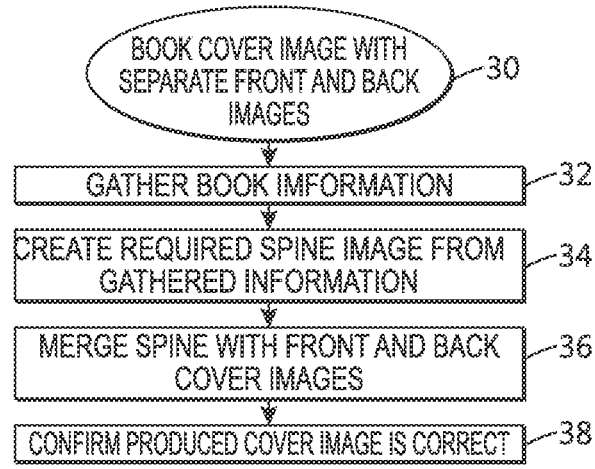
FIG. 3 is a flow chart of a process showing how a spine is placed into a book cover image with separate front and back image images.

If in FIG. 3, as a second example, the user makes the choice to create a spine when the front and back covers are originally separate images that were originally created for a saddle stitched book in block 30, the computer system automatically: (a) gathers book information in block 32; (b) creates in block 34 the required spine image based on the information it gathered and/or calculated in block 32; (c) it then creates in block 36 a new, single cover image by merging the back cover, spine, and front cover into a single image; and (d) the user then in block 38 visually and/or numerically confirms that the new cover image is correct. In either example, if the image is not exactly the way the user wants it, the settings can be adjusted manually and then have the system regenerate the image.

It should now be understood that a method has been disclosed for use by workflow automation products that automatically re-purposes a cover image that does not have a spine as, for example, saddle stitch books into a cover image that does have a spine to thereby reap the benefits of increased efficiency and accuracy for customers. The method includes adding an image area between the front and back cover images to make a single image. Alternatively, the existing image is stretched anamorphically to accommodate a correctly sized spine. Text can be added to the new spines as desired.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A method for automatically generating digital spine image areas for book covers that are originally separate front and back digital images, comprising;
    gathering information including: the height of the book; the thickness of the book; any text to be placed in the image areas; color, font and orientation of the text; background color; and location of cover file and book block file;
    creating the required spine image from electronic settings based on the information gathered;
    creating a single cover image by merging the back cover, spine, and front cover into a single image; and
    confirming that the produced cover image is correct.

2. The method of claim 1, wherein said confirming that the produced cover image is correct is made by visuals.

3. The method of claim 1, wherein said confirming that the produced cover image is correct is done numerically.

4. The method of claim 2, including adjusting settings if the cover image is not exactly as the user desires.

5. The method of claim 3, including adjusting settings if the cover image is not exactly as the user desires.

6. The method of claim 4, including regenerating the cover image.

7. The method of claim 5, including regenerating the cover image.

* * * * *